United States Patent [19]

Omori

[11] Patent Number: 4,535,953
[45] Date of Patent: Aug. 20, 1985

[54] SPINNING TYPE FISHING REEL WITH AXIALLY ADJUSTABLE SPOOL

[75] Inventor: Hatsutaro Omori, Oyama-higashi, Japan

[73] Assignee: Kabushiki Kaisha Ohmori Seisakusho, Japan

[21] Appl. No.: 566,229

[22] Filed: Dec. 28, 1983

[51] Int. Cl.³ .............................................. A01K 89/01
[52] U.S. Cl. ............................... 242/84.21 R; 242/84.4
[58] Field of Search ................... 242/84.21 R, 84.21 A, 242/84.2 R, 84.4

[56] References Cited

U.S. PATENT DOCUMENTS

| | | | |
|---|---|---|---|
| 2,734,693 | 2/1956 | Rabezzana | 242/84.21 R |
| 2,865,662 | 12/1958 | Nurmse | 242/84.2 R X |
| 3,119,573 | 1/1964 | Brulhart | 242/84.21 R |
| 3,138,344 | 6/1964 | Small | 242/84.21 R |

FOREIGN PATENT DOCUMENTS

| | | | |
|---|---|---|---|
| 2801504 | 7/1979 | Fed. Rep. of Germany | 242/84.2 R |
| 46358 | 6/1936 | France | 242/84.21 R |
| 47178 | 2/1937 | France | 242/84.21 R |
| 473239 | 10/1937 | United Kingdom | 242/84.21 R |

Primary Examiner—Stuart S. Levy
Assistant Examiner—Joseph J. Hail, III
Attorney, Agent, or Firm—Michael D. McCully

[57] ABSTRACT

A spinning type fishing reel, including a spool shaft, a spool mounted on the spool shaft so as to be rotationally fixed with respect thereto and so as to be axially movable with respect thereto, and an adjustment member mounted on the spool shaft so as to be rotationally movable with respect thereto and so as to be axially fixed with respect thereto. A screw drive assembly includes a male threaded construction coaxial with the spool shaft and a female threaded construction screwingly cooperating with the male threaded construction and also coaxial with the spool shaft. One of the male and female threaded constructions is fixed with respect to the adjustment member, and the other of the male and female threaded constructions is fixed with respect to the spool. When the adjustment member is rotated with respect to the spool and the spool shaft, with the spool remaining rotationally stationary with respect to the spool shaft, this rotates the male and female threaded constructions with respect to one another, thus causing them to be axially moved with respect to one another by their mutual screwing action; and this axially drives the spool with respect to the adjustment member and the spool shaft. This provides a way of adjusting the axial position of the spool on the spool shaft, so as, when winding up the fishing line on the spool, to avoid either the excessively front wound condition or the excessively back wound condition.

3 Claims, 14 Drawing Figures

FIG. I(a)
PRIOR ART
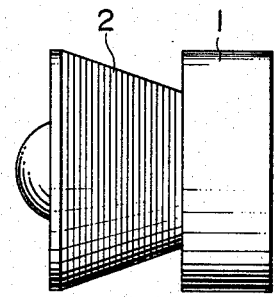
FIG. I(b)
PRIOR ART
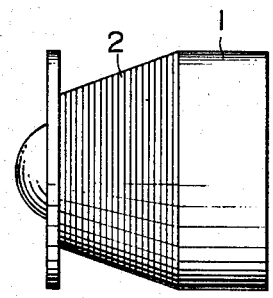
FIG. I(c)
PRIOR ART
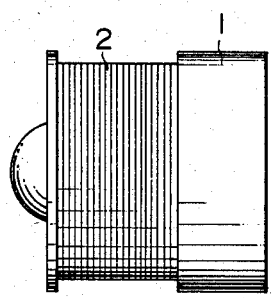

SPINNING TYPE FISHING REEL WITH AXIALLY ADJUSTABLE SPOOL

BACKGROUND OF THE INVENTION

The present invention relates to a spinning type fishing reel, and, more particularly, relates to a spinning type fishing reel with a novel structure for promoting proper winding up of the fishing line.

Generally, with a spinning type fishing reel of the per se conventional sort in which a spool cup and a bail attached thereto are rotated so as to wind fishing line onto a spool which is simultaneously itself axially reciprocated to and fro, some problems tend to occur with winding of the fishing line onto the spool, as follows.

If a relatively fine fishing line with a relatively small diameter is used, then, as the line is wound up, since the center of the cross section of the fishing line at the point where it contacts with the bail tends to be offset towards the front of the fishing reel, relative to the reciprocating range of the spool, the so called front wound condition tends to occur, with an excessive amount of the fishing line wound on the front portion of the spool and with not enough of the fishing line wound on the rear portion of the spool. This condition is illustrated in FIG. 1(a) of the accompanying drawings, which is a side view of such a spool 1 of a prior art spinning type fishing reel, with a number of turns 2 of fishing line wound thereon in the front wound condition. On the other hand, if a relatively coarse fishing line with a relatively large diameter is used, then, as the line is wound up, since the center of the cross section of the fishing line at the point where it contacts with the bail tends to be offset towards the rear of the fishing reel, relative to the reciprocating range of the spool, the so called back wound condition tends to occur, with an excessive amount of the fishing line wound on the rear portion of the spool and with not enough of the fishing line wound on the front portion of the spool. This condition is illustrated in FIG. 1(b) of the accompanying drawings, which in a similar fashion to FIG. 1(a) shows a prior art spinning type fishing reel spool 1 with a number of turns 2 of fishing line wound thereon in the back wound condition. FIG. 1(c) shows in the same way an example of proper winding of a fishing line 2 onto a prior art spool 1, in an even fashion, being neither substantially front wound nor substantially back wound.

Further, even when the thickness of the fishing line is not considered as varying, the use of a heavier sink tends to cause the front wound condition, while the use of a lighter sink tends to cause the back wound condition. Further, due to inevitable inaccuracies engendered by practical manufacturing and assembly tolerances, sometimes different particular production fishing reels of the same design have varying characteristics with regard to tendency to suffer from the front wound or the back wound condition, during actual use.

Now, when the fishing line is being wound in by the fisherman onto the spool, and either the front wound condition or the back wound condition occurs, then either the front or the back of the spool can become quite filled with loops of the line. In an extreme case, these loops of line can overflow the front or the back end of the spool, and thus it is possible for loops of the fishing line to come off the spool while the winding up process is still in progress. Such coming off of loops of the line can cause the line to become entangled with some other part of the fishing reel, which can be a very serious inconvenience. Even if the winding up process of the line is accomplished successfully, if either the front wound condition or the back wound condition has occurred during this winding to a substantial extent, then the piled up windings of fishing line towards one end of the spool tend to collapse towards the other end of the spool, and due to this when next casting the line a considerable number of loops thereof are liable to come off the spool at the same time, thus causing a most undesirable tangling of the fishing line with the fishing reel.

Thus, for avoiding such inconveniences, it is very desirable that a spinning type fishing reel should be able to always provide winding up of the fishing line onto the spool thereof in a proper fashion, i.e. to a first approximation in an evenly wound condition, being neither front wound nor back wound. In fact, a slightly back wound condition for the winding up of the fishing line on the spool is most desirable, from the point of view of extending the possible distance of casting. However, in prior art conventional types of spinning type fishing reel, no adjustment of the winding pattern for the fishing line onto the spool has been possible, and accordingly it has not been possible for the user to perform any compensation for thick fishing line as opposed to thin fishing line, nor for a heavy sink as opposed to a light sink.

SUMMARY OF THE INVENTION

Therefore, it is the primary object of the present invention to provide a spinning type fishing reel, during the use of which it is possible for the user to perform adjustment so as to ensure the production of a desirable winding condition for the fishing line on the spool thereof.

It is a further object of the present invention to provide such a spinning type fishing reel, during the use of which adjustment can be performed so as to compensate for the use of a thin fishing line.

It is a further object of the present invention to provide such a spinning type fishing reel, during the use of which adjustment can be performed so as to compensate for the use of a thick fishing line.

It is a further object of the present invention to provide such a spinning type fishing reel, during the use of which adjustment can be performed so as to compensate for the use of either a light or a heavy sink.

It is a further object of the present invention to provide such a spinning type fishing reel, during the use of which adjustment can be performed so as to avoid an unduly severe front wound winding condition for the fishing line upon the spool.

It is a further object of the present invention to provide such a spinning type fishing reel, during the use of which adjustment can be performed so as to avoid an unduly severe back wound winding condition for the fishing line upon the spool.

It is a further object of the present invention to provide such a spinning type fishing reel, during the use of which adjustment can be performed so as to help to prevent multiple loops of the fishing line coming off the reel at the same time.

It is a further object of the present invention to provide such a spinning type fishing reel, during the use of which adjustment can be performed so as to help to prevent tangling of the fishing line upon the reel during winding in of the fishing line.

It is a further object of the present invention to provide such a spinning type fishing reel, during the use of which adjustment can be performed so as to help to prevent tangling of the fishing line upon the reel during casting of the sink.

It is a further object of the present invention to provide such a spinning type fishing reel, during the use of which adjustment can be performed so as to provide a desirably slightly back wound winding condition for the fishing line upon the spool.

It is a further object of the present invention to provide such a spinning type fishing reel, during the use of which adjustment can be performed so as to wind the fishing line upon the spool in such a way as to ensure a good casting distance.

It is a yet further object of the present invention to provide such a spinning type fishing reel, during the use of which adjustment can be performed so as to alter the axial position of the spool.

It is a yet further object of the present invention to provide such a spinning type fishing reel, during the use of which the adjustment which has been performed is properly preserved.

It is a yet further object of the present invention to provide such a spinning type fishing reel, during the use of which a previously used value for such axial spool adjustment can be easily reproduced by the user.

It is a yet further object of the present invention to provide such a spinning type fishing reel, during the use of which the spool can easily be removed from the reel, and can be easily replaced.

According to the present invention, these and other objects are accomplished by a spinning type fishing reel, comprising: (a) a spool shaft; (b) a spool mounted on said spool shaft so as to be rotationally fixed with respect thereto and so as to be axially movable with respect thereto; (c) an adjustment member mounted on said spool shaft so as to be rotationally movable with respect thereto and so as to be axially fixed with respect thereto; and (d) a screw drive assembly, comprising a male threaded construction coaxial with said spool shaft and a female threaded construction screwingly cooperating with said male threaded construction and also coaxial with said spool shaft, one of said male and female threaded constructions being fixed with respect to said adjustment member, and the other of said male and female threaded constructions being fixed with respect to said spool.

According to such a structure, when the adjustment member is rotated with respect to the spool and the spool shaft, with of course the spool remaining rotationally stationary with respect to the spool shaft, this rotates the male threaded member and the female threaded member of the screw drive assembly with respect to one another, thus causing them to be axially moved with respect to one another by their mutual screwing action; and this axially drives the spool with respect to the adjustment member. Since the adjustment member is axially fixed with respect to the spool shaft, the result of this is that the axial position of the spool on the spool shaft is altered, and by setting the adjustment member (which typically is a knob) to a particular position with respect to the spool, any particular desired position of the spool on the spool shaft, within a relevant range of course, can be assured. This provides a way of adjusting the spool on the spool shaft so as, when winding up the fishing line on the spool, to avoid either the excessively front wound condition or the excessively back wound condition. That is, the tendency to produce the front wound condition can be cancelled by moving the spool towards the front of the fishing reel relative to the adjustment member and the spool cup, thereby offsetting the center of the cross section of the fishing line at the point where it contacts with and is guided by the bail towards the rear of the fishing reel relative to the reciprocating range of the spool; while the tendency to produce the back wound condition can be cancelled by moving the spool towards the rear of the fishing reel relative to the adjustment member and the spool cup, thereby offsetting the center of the cross section of the fishing line at the point where it contacts with and is guided by the bail towards the front of the fishing reel relative to the reciprocating range of the spool. Thereby, a desirable winding condition for the fishing line on the spool can be assured, and, if an evenly wound condition is desired, or alternatively a slightly rear wound condition is desired in view of the desirability of maximizing the casting distance, that can be provided. By thus easily and quickly adjusting the axial position of the spool on the spool shaft, the effects of a thick line, or alternatively of a thin line, can be compensated for; and also the effects of varying the weight of the sink can be compensated for. Thus, it is possible to help to prevent loops of the fishing line from coming off from the spool to become entangled with the fishing reel, both during winding in of the fishing line when as explained above the danger of the line overflowing one or the other end of the spool can occur, and during casting, when as explained above the danger of many loops of the line coming off the spool together can occur.

Further, according to a particular specialization of the present invention, these and other objects are more particularly provided by a spinning type fishing reel of the type described above, further comprising a means for providing stepwise motion between said adjustment member and said spool.

According to this specialized structure, adjustment of the spool on the spool shaft, once set, is properly preserved, and cannot easily slip.

Further, according to a particular specialization of the present invention, these and other objects are more particularly provided by a spinning type fishing reel of the type first described above, an end of said spool shaft being formed with a taper and a circumferentially extending groove, further comprising: a shaft grip spring mounted to said adjustment member and substantially fixed thereto with regard to relative movement therebetween in the axial direction, comprising an engagement portion which, when said adjustment member and said spool are mounted on said spool shaft and properly axially positioned, engages into said spool shaft circumferential groove and holds said adjustment member and said spool on said spool shaft; and a means for selectively bending said shaft grip spring so as to lift said engagement portion thereof out from said spool shaft circumferential groove and thus releasing said adjustment member and said spool from said spool shaft.

According to this specialized structure, the combination of the adjustment member and the spool can be easily released from the spool shaft, so as to change the spool for one which has a different type of fishing line thereon, for example.

Further, according to a particular specialization of the present invention, these and other objects are more particularly provided by a spinning type fishing reel of the type proximately described above, wherein said means for selectively bending said shaft grip spring comprises a push button and a spring which biases said push button in a first direction; said push button, when pushed in a direction opposite to said first direction, interfering with said shaft grip spring so as to lift said engagement portion thereof out from said spool shaft circumferential groove.

According to this specialized structure, by pushing this push button, the spool and the adjustment member may be easily removed, as explained above.

Further, according to a yet more particular specialization of the present invention, these and other objects are more particularly provided by a spinning type fishing reel of the type first described above, wherein one of said spool and said adjustment member has a scale provided thereon, and the other has an index mark provided thereon which opposes said scale.

According to this yet more specialized structure, the adjustment position of the spool on the spool shaft is defined by the position of said index mark relative to said scale, and so the point on said scale indicating a particular satisfactory spool adjustment position can be remembered by the user of the fishing reel, and thus that spool adjustment position can be reproduced easily when required, without any need for experimentation.

BRIEF DESCRIPTION OF THE DRAWINGS

The present invention will now be described with reference to its preferred embodiment, and with reference to the accompanying drawings. It should be understood, however, that the description of the embodiment, and the drawings, are all of them given for the purposes of illustration and exemplification only, and are not to be taken as limitative of the present invention, the scope of which is to be defined solely by the appended claims. In the drawings, like parts are denoted by like reference symbols in the various figures thereof, and:

FIG. 1, which relates to the prior art, consists of three views (a), (b), and (c), and shows in view (a) a prior art spinning type fishing reel with fishing line wound on it in the front wound condition, in view (b) a prior art spinning type fishing reel with fishing line wound on it in the rear wound condition, and in view (c) a prior art spinning type fishing reel with fishing line wound on it in a properly wound condition;

DESCRIPTION OF THE PREFERRED EMBODIMENT

Figure 2:
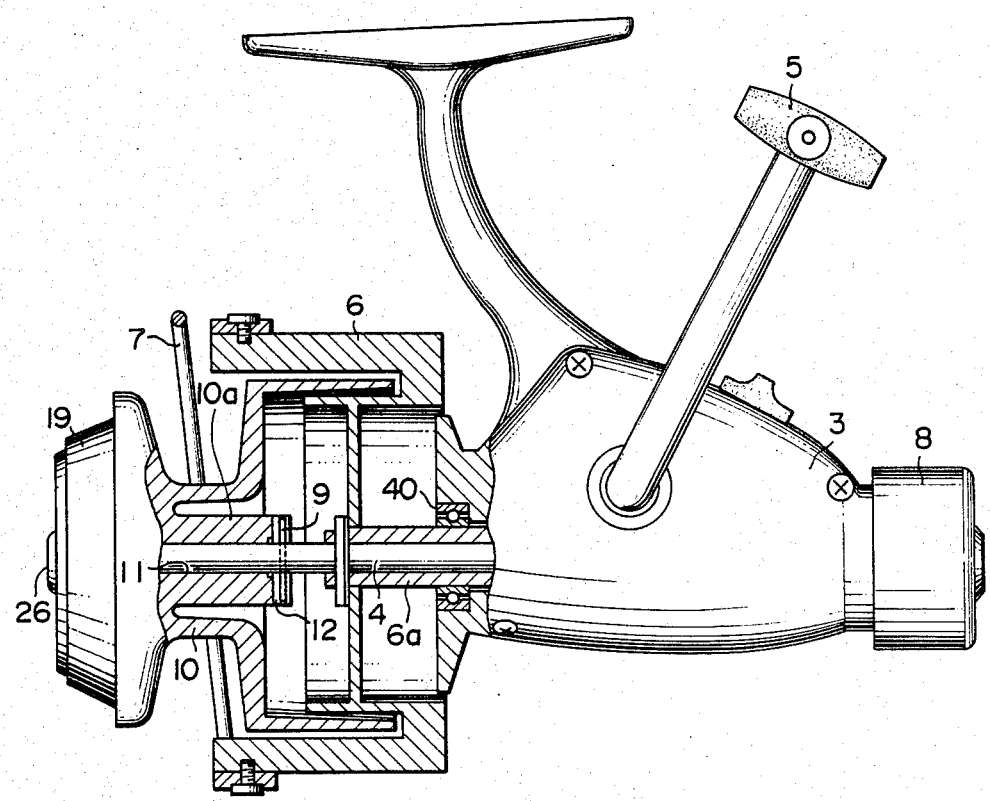
FIG. 2 is a side view of the preferred embodiment of the spinning type fishing reel of the present invention, partly cut away in longitudinal section.

The present invention will now be described with regard to its preferred embodiment and with respect to FIGS. 2 through 12 of the appended drawings. FIG. 2 shows a side view of said preferred embodiment of the spinning type fishing reel of the present invention, which is generally structured conventionally, except for the portion thereof which will be particularly described hereinafter, and which incorporates a per se conventional drag device on the rear end of the spool shaft. In FIG. 2, the fishing reel is shown as partially cut away in longitudinal section, and in FIG. 3 there is shown an enlarged sectional view of an essential part of said fishing reel, taken in the same plane as that of FIG. 2. In the FIGS., the reference numeral 3 denotes the body of the fishing reel, and a spool shaft 4 is slidably and rotatably mounted and extends along the longitudinal direction within this body 3. The body 3 also rotatably supports a handle shaft, not shown but extending perpendicular to the drawing paper in FIGS. 2 and 3, and on an outer end of this handle shaft there is mounted a handle 5 (see FIG. 2). Further, the main body 3 freely rotatably supports via a ball bearing 40 a spool cup shaft 6a, and a spool cup 6 of a per se conventional sort is fixedly mounted on the spool cup shaft 6a, while a spool shaft 4 is freely rotatably mounted in a central axial hole of said spool cup shaft 6a. On the spool cup 6 there is mounted a bail 7, also per se conventional. Within the body 3 there is provided a per se conventional fishing line winding mechanism, which is not shown in the figures and which will be described herein only with regard to its function: when the handle 5 is turned by the hand of the fisherman, this winding mechanism rotates the spool cup shaft 6a, the spool cup 6, and the bail 7 with respect to the main body 3, while reciprocating the spool shaft 4 to and fro longitudinally in the main body 3 but not substantially rotating said spool shaft 4. A per se conventional drag device, not particularly shown in detail, but controlled by a knob 8, is provided for selectively retarding rotational motion of the spool shaft 4, as desired.

Through a part of the spool shaft 4 outward of the spool cup 6 from the body 3 there is transversely fixed a guide pin 9, which extends radially to said spool shaft in opposite radial directions. A spool 10 is formed with a boss portion 10a, through which a mounting through hole 11 of substantially the same radius as the spool shaft 4 is formed. As most clearly shown in FIG. 4, which is an end on view of the inner end of said boss portion 10a, the inner end of this boss portion is formed with two transversely extending guide slots 12 which are mutually perpendicular, i.e. forming a cross shape; thus, these guide slots 12 extend across the transverse direction of the boss portion 10a and also have a certain longitudinal extent from the inner end portion of said boss portion 10a along its central axis. The spool 10 is fitted slidably over the outer end of the spool shaft 4 by its boss portion 10a, as will be more particularly explained later, and one or the other of the guide slots 12 is fitted over the guide pin 9, so that by this construction the spool 10 is rotationally coupled to the spool shaft 4, but is not prevented from moving with respect thereto in the longitudinal direction for a certain distance defined by the axial length of the slots 12. The outer end portion of the spool shaft 4 which projects beyond the boss portion 10a of the spool 10 is formed as a narrowed portion 4b, and the tip of this spool shaft 4 is formed as a tapered portion 4a; a spring engagement groove 17 is defined between said tapered portion 4a and the narrowed portion 4b.

The construction by which the spool 10 is adjustably fixed to the spool shaft 4 with regard to movement therebetween in the longitudinal or axial direction relates to the central concept of the present invention, and will now be described.

Figure 3:
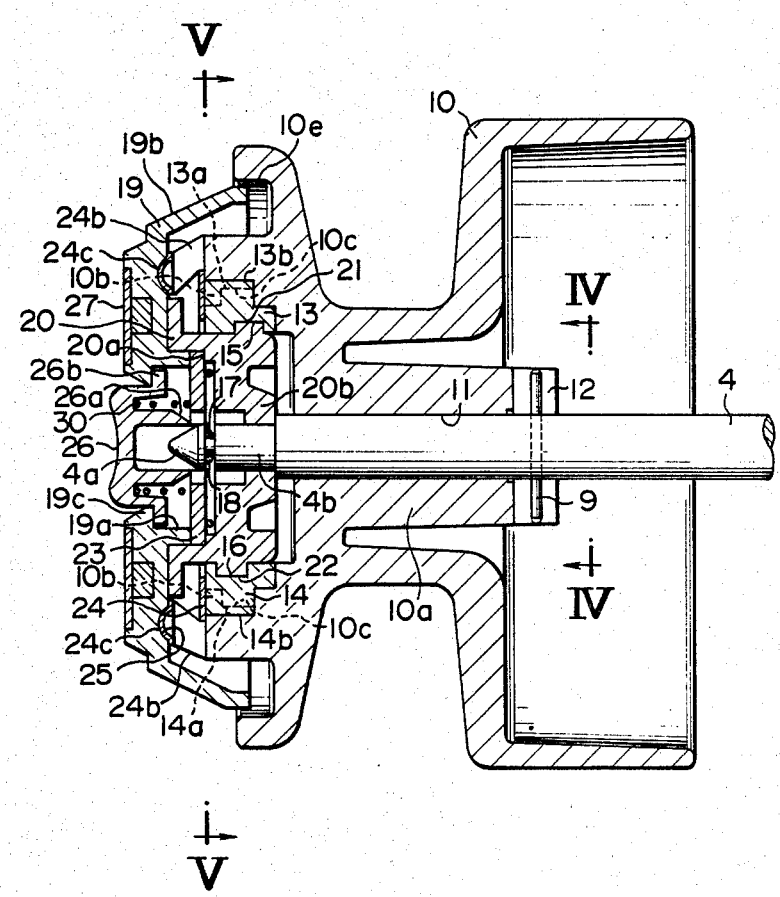
FIG. 3 is an enlarged sectional view of an essential part of said preferred embodiment, taken in the same plane as that of FIG. 2.
Figure 4:
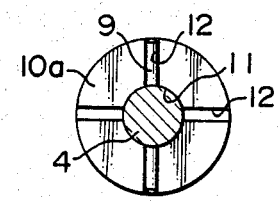
FIG. 4 is a vertical sectional view taken along line IV-IV in FIG. 3 showing the inner end of a boss of the fishing reel spool about the spool shaft.
Figure 5:
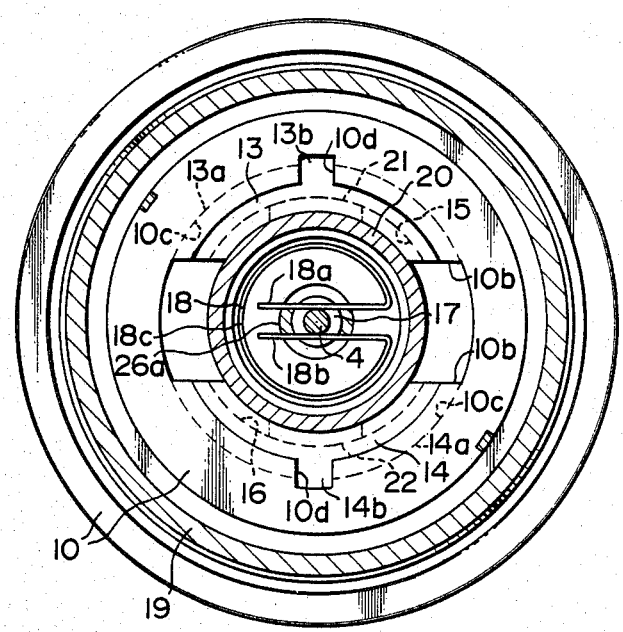
FIG. 5 is a sectional view of a spool adjustment knob assembly and a spool fixing spring, taken in a plane shown by the arrows V—V in FIG. 3.
Figure 6:
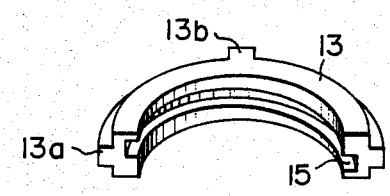
FIG. 6 is a perspective view of a half annular part of a spool side threaded assembly.

A substantially annular shaped spool side threaded assembly is made up of a pair of substantially half annular shaped spool side threaded members 13 and 14; this breaking up of the spool side threaded assembly into two parts, in this preferred embodiment of the present invention, is done for the purposes of constructional and assembly convenience. These members 13 and 14 are similar to one another, being each formed, as shown in FIG. 6 which is a perspective view of the spool side threaded body 13, as a half annulus, with a locating ridge 13a, 14a around its outer surface for axially engaging it with the body of the spool 10 as will be explained shortly, with a locating projection 13b, 14b for rotationally engaging it with said body of the spool 10, and with a part of a female thread 15, 16 incised around its inner surface. This spool side threaded assembly consisting of the members 13 and 14 is fitted, as shown in FIGS. 3 and 5, into the inside of an outer portion 10b of the spool 10, with the locating ridges 13a, 14a engaging into a circular groove 10c formed in said outer spool portion 10b, so as to locate said spool side threaded assembly with respect to the axial direction of the spool 10, and with the two locating projections 13b, 14b engaging into corresponding depressions 10d located on said circular groove 10c, so as to locate said spool side threaded assembly with regard to relative rotational movement between it and the spool 10. Thus at this time, in cooperation with one another, the two female thread shapes 15 and 16 cooperate to define a female thread shape which is axially fixed relative to the spool 10, and the two members 13 and 14 make up one member in terms of function.

A spool adjustment knob assembly comprises a knob 19, a knob side threaded member 20, and a washer 23, all of which parts are securely fixed together so as to make up one integral assembly; these parts are made separate for reasons of constructional and assembly convenience. In fact, as can be understood from FIG. 3, the knob side threaded member 20 is formed with a boss portion 20b with a hole therein of substantially the same diameter as the diameter of the narrowed portion 4b of the spool shaft 4, with male threaded shapes 21 and 22 on its outside surface of substantially the same configuration as and corresponding to the female thread defined by the combination of the pair of half annular spool side threaded members 13 and 14 (and which are made separate for reasons of construction and assembly convenience), and with a central depression on the inside surface of which is defined an annular step 20a.

Figure 10:
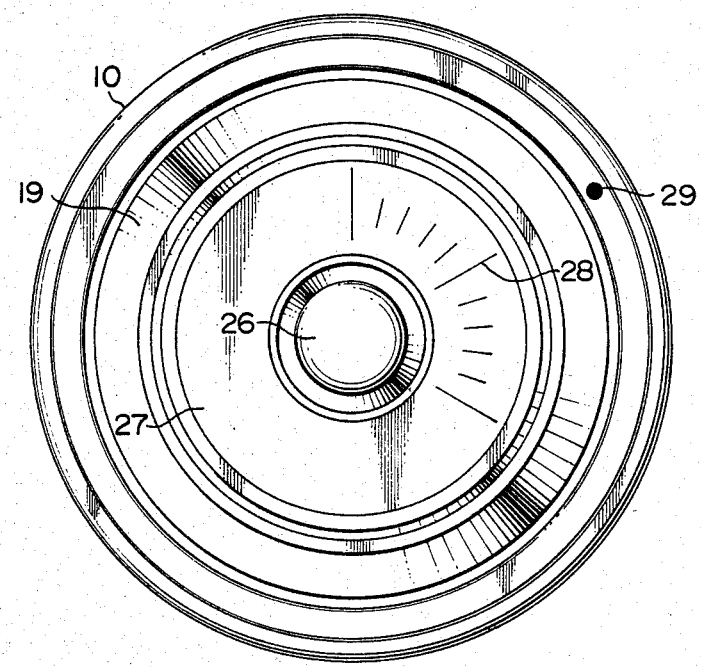
FIG. 10 is a view of the knob and the spool of the fishing reel as seen from the left side of FIG. 3.
Figure 11:
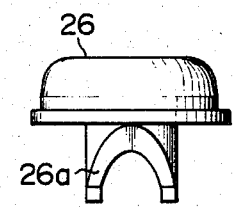
FIG. 11 is a side view of the push button of FIG. 8 as seen in a direction angled at ninety degrees to the plane of FIG. 8.
Figure 12:
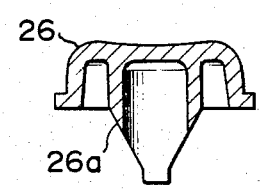
FIG. 12 is a schematic sectional view of the push button of FIGS. 8 and 11.

The washer 23 is fitted into said central depression and rests against said annular step 20a, and thus a small disk shaped space is defined between said washer 23 and the bottom of said central depression. The knob 19 is formed with a central hole around which there projects a tubular protuberance 19a which is fitted tightly into said depression, against said washer 23; thus these three members, the knob 19, the knob said threaded member 20, and the washer 23, are tightly connected together. The inside surface of this central hole of the knob 19 is formed with an inwardly extending lip shape 19c. Further, the outer portion of the knob 19 is formed with a large inwardly extending flange 19b. A scale plate 27 is fitted on the outer end surface of the knob 19; this is best seen in FIG. 10, which is a view of the knob 19 and the spool 10 as seen from the left side of FIG. 3.

Within the small disk shaped space defined between the washer 23 and the bottom of the central depression in the knob side threaded member 20 there is snugly housed a spool fixing spring 18. As best seen in FIG. 5, which is a sectional view of the spool adjustment knob assembly and this spool fixing spring 18 taken in a plane shown by the arrows V—V in FIG. 3, this spring 18 is formed with two substantially parallel end gripping portions 18a and 18b which lie very close together when the spring is in its unstressed condition and with an intermediate portion 18c therebetween which is curved into almost a complete circle. When the fishing reel is to be assembled as shown in FIG. 2, then the tapered end 4a of the spool shaft 4 is inserted into the hole of the boss 10a of the spool 10 and is pushed therethrough, with the pin 9 aligned with one of the grooves 12 in the boss 10a so that it can enter thereinto. This tapered end 4a then enters between the two parallel end gripping portions 18a and 18b of the spool fixing spring 18, driving them apart and flexing the intermediate ring spring portion 18c. Then, these two gripping portions 18a and 18b snap towards one another while entering into the spring engagement groove 17, and thereafter hold the spool adjustment knob assembly securely fixed with respect to the spool shaft 10 in the axial direction, while allowing it freely to turn with respect thereto around their central axis. Further, the male threads 21, 22 formed on the knob side threaded member 20 are fitted into and screwingly cooperate with the female thread defined by the cooperation of the female thread shapes on the spool side threaded members 13 and 14; and the axial adjustment position of this threaded engagement defines the relative axial position of the spool 10 and the spool fixing spring 18. The flange 19b of the knob 19 at this time fits roughly into a flange groove 10e formed on the outer portion of the spool 10, thus ensuring that foreign bodies cannot easily enter the mechanism to interfere between the spool 10 and the knob side threaded member 20.

Figure 8:
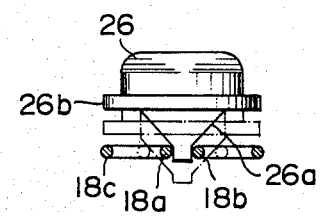
FIG. 8 is a side view of a release push button and of a part of said spool fixing spring with which it cooperates.

Further, a release mechanism is provided for disassembling the fishing reel, i.e. for releasing the spool 10 and the spool knob adjustment assembly from the spool shaft 10, which will now be described. A push button 26 is fitted into the central hole of the knob 19, and is biased in the outwards direction by a compression coil spring 30, the inner end of which bears on the washer 23, so that a lip 26b on said push button 26 is biased against said annular step shape 19c on the inner surface of said hole, said step shape 19c acting as a stop construction. The inner side of the push button 26, as may be best seen in FIG. 8 which is a side view of said push button 26 and of the part of the knob fixing spring 18 with which it cooperates, and in FIG. 11 which is a side view of said push button 26 as seen in a direction angled at ninety degrees to the plane of FIG. 8, is formed with two tapered actuating prongs 26a, of appropriate size and shape for entering between the gripping portions 18a and 18b of said fixing spring 18, when they are engagingly entered into said groove 17 of the spool shaft 4, and for forcing said gripping portions 18a and 18b apart when pushed in the rightwards direction as seen in FIG. 3. Thus, from the state of the apparatus in which the spool 10 and the adjustment knob assembly are fixed onto the spool shaft 4 by the fixing spring 18 as explained above, if the push button 26 is pushed by the finger of the operator, then the compression coil spring 30 is compressed, and the tapered prongs 26a of the push button 26 enter between the gripping portions 18a and 18b of the fixing spring 18, spread them apart as indicated by the dash-dotted line in FIG. 8 so as to lift them out of the groove 17, and thus release the spool 10 and the spool adjustment knob assembly from the spool shaft 4, so that they may be pulled away therefrom.

Now, when as explained above the fixing spring 18 is engaged into the groove 17 of the spool shaft 4, so as to fix the spool adjustment knob assembly axially with respect to said spool shaft 4, the axial position of the spool 10 on said spool shaft 4 may be freely varied within a certain range by turning the knob 19 with respect to the spool 10: this procedure turns the male thread shapes 21 and 22 formed on the knob side threaded member 20 along in and with respect to the female thread 15, 16 defined in the spool side threaded assembly, which alters the relative positioning of the spool 10 with respect to the spool adjustment knob assembly and thus with respect to the spool shaft 4. Thereby, the tendency of the fishing line to become front wound, evenly wound, or back wound, during use of the fishing reel, can be adjusted freely by the fisherman, and any desired winding condition for the fishing line may be selected, such as for example the evenly wound condition, or alternatively a slightly back wound condition which as suggested hereinbefore may be preferred in certain circumstances from the point of view of increasing the maximum possible casting distance. This selection may be altered at any desired time, as for example when using thicker fishing line, or thinner fishing line, or when using a heavier or a lighter sink. By the proper utilization of this adjustment mechanism, the unduly front wound condition for the fishing line, as well as the unduly back wound condition, can be avoided; and accordingly overflowing of the fishing line off the spool during winding in of the line can be avoided. This means that the potential danger of tangling of the line during winding in thereof can be practically obviated. Further, the risk of tangling of the fishing line during casting by the occurrence of collapse of piled up coils of wound in fishing line on the spool is also much reduced. And by the above described release construction incorporating the push button 26, the spool can be quickly released from the fishing reel, and can be replaced by another spool for instance, very quickly and easily.

The positioning of the knob 19 with respect to the spool 10 may be conveniently judged by the fisherman using the reel by seeing with which one of the marks 28 inscribed on the scale plate 27 a mark 29 inscribed on the spool 10 is aligned. This makes it easy for the fisherman to quickly and accurately reproduce an adjustment which he or she knows from previous experience will be satisfactory in particular circumstances, such as for use with a particular fishing line and a particular sink, without any need for repeated experimentation. Further, this positioning is positively retained and ensured by a construction which will now be described.

Figure 7:
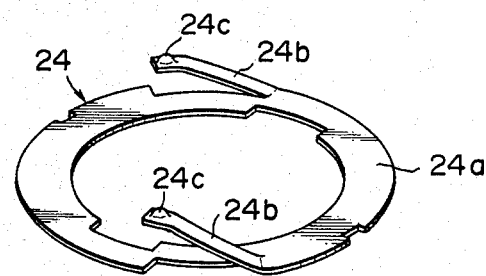
FIG. 7 is a perspective view of a relative positioning spring.
Figure 9:
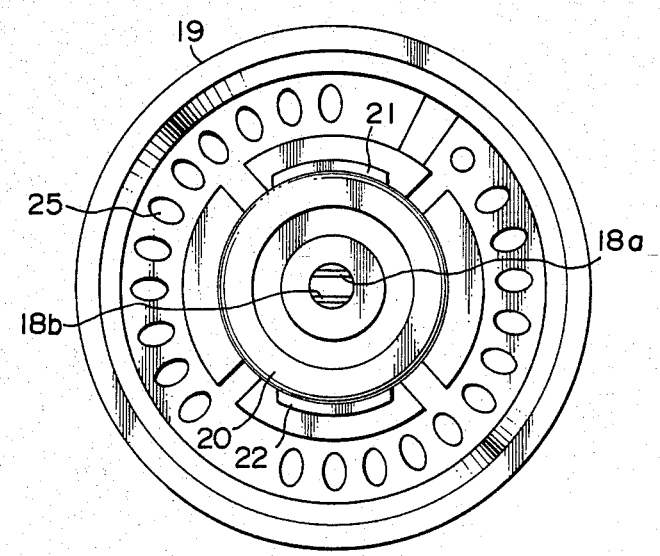
FIG. 9 is a view of the inner side of a knob of the fishing reel, particularly shown indexing depressions formed thereon.

A spring 24 for relative positioning is mounted to the spool 10 in a secure fashion, and confronts the outer circumferential portion of the inner side of the knob 19. As best seen in FIG. 7, which is a perspective view of this relative position spring 24, this spring 24 is formed with an annular main body 24a and with two raised prongs 24b protruding therefrom, said prongs 24b having projections 24c formed on them. Further, as seen in FIG. 9 which shows the inner side of said knob 19, this knob inner side is formed with a number of depressions 25 in a circular arrangement. When the fishing reel is assembled, as shown in FIG. 3, each of the two projections 24c on the prongs 24b preferentially enters into one or the other of the depressions 25, and this provides a certain resistance which prevents the knob 19 from turning with respect to the spool 10 unless a torque greater than a certain threshold torque is applied therebetween. Further, a stepping effect is provided for relative rotational positioning between the knob 19 and the spool 10. This function ensures that, once the fisherman using the real has set the axial position of the spool to a one which will be satisfactory, this axial position cannot easily become accidentally displaced, as by vibration or the like, but is properly preserved.

As described above, the spinning type fishing reel of the present invention is able to provide the advantage of simple and easy axial adjustment of the position of the spool on the spool shaft, so as to cope with the problems of front winding and back winding of the fishing line on the spool. This is provided by a simple and reliable construction, which is suitable for mass production. Therefore, although the present invention has been shown and described with respect to a preferred embodiment thereof, it should not be considered as being limited thereto. For example, although the spool side threaded assembly has been shown as bearing a female thread shape, while the knob side thread has been a male thread, of course this construction could be reversed, with the male thread on the spool side and the female thread on the knob side. Many other modifications could be made to the detail of any particular embodiment of the present invention, without departing from its essential scope. Accordingly, the scope of the present invention, and the monopoly desired to be provided by Letters Patent, should be considered as being defined not by any of the perhaps purely fortuitous details of the shown embodiment, or of the drawings, but solely by the claims, which follow.

What is claimed is:
1. A spinning type fishing reel, comprising:
 (a) a spool shaft having a tapered end and an annular groove adjacent said tapered end;
 (b) a spool mounted on said spool shaft so as to be rotationally fixed relative thereto and axially movable thereon;
 (c) an adjustment mechanism mounted on said spool shaft so as to be axially fixed relative thereto and rotationally movable thereon, said adjustment mechanism for adjusting the axial position of said spool relative to said spool shaft;
 (d) a screw drive assembly, comprising a male threaded construction coaxial with said spool shaft and a female threaded construction threadedly cooperating with said male threaded construction and also coaxial with said spool shaft, one of said male and female threaded constructions being fixed relative to said adjustment mechanism, and the other of said male and female threaded constructions being fixed relative to said spool;

(e) stepping mechanism means for providing stepwise motion between said adjustment mechanism and said spool;

(f) a shaft grip spring mounted to said adjustment mechanism and substantially fixed thereto with regard to relative movement therebetween in the axial direction, said spring having an engagement portion which engages said spool shaft annular groove and retains said adjustment mechanism and said spool on said spool shaft; and (g) a release mechanism mounted with said adjustment mechanism for releasing said spool and adjustment mechanism from said spool shaft by releasing said spring from said shaft annular groove, said release mechanism comprising a push button having a tapered end spring engaging surface for separating said spring from said annular groove.

2. A spinning type fishing reel according to claim 1, wherein one of said spool and said adjustment mechanism has a scale provided thereon, and the other has an index mark provided thereon which opposes said scale.

3. A spinning type fishing reel according to claim 1, wherein said stepping mechanism means comprises a spring mounted with said spool, said spring including two raised prongs that engage selective pairs of a plurality of indentations in said adjustment mechanism.

* * * * *